Sept. 12, 1972 SOL ESTER HARRISON ET AL 3,690,889
PHOTOCOLORABLE VACUUM SUBLIMED XANTHENE DYE
Filed Sept. 30, 1970
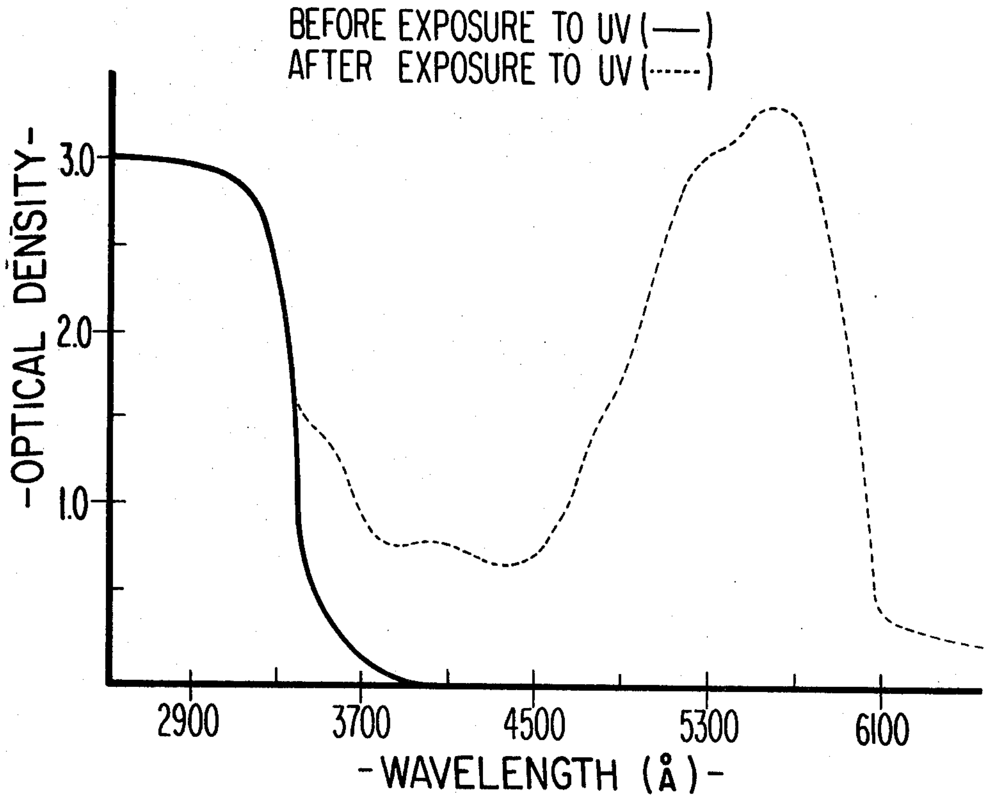
INVENTORS.
Sol E. Harrison &
Robert Drake.
BY [signature]
ATTORNEY United States Patent Office 3,690,889

Patented Sept. 12, 1972

3,690,889
PHOTOCOLORABLE VACUUM SUBLIMED XANTHENE DYE

Sol Esther Harrison, Huntingdon Valley, Pa., and Robert Drake, Old Bridge, N.J., assignors to RCA Corporation, New York, N.Y.

Filed Sept. 30, 1970, Ser. No. 76,906
Int. Cl. G03c *1/52*
U.S. Cl. 96—90 7 Claims

ABSTRACT OF THE DISCLOSURE

An optical recording and storage media comprises a substrate having an essentially colorless vacuum sublimed xanthene dye type film thereon. The xanthene dye is of the type having a pendant phenyl ring at the 9th carbon of the xanthene structure. A COOH group is present on the carbon atom of the phenyl ring immediately adjacent the linking carbon of the ring. Electron withdrawing groups are present on the xanthene structure. An example of such a material is rhodamine B.

BACKGROUND OF THE INVENTION

This invention relates to optical recording media particularly useful as a computer storage media or as a video recording media.

Optical recording by means of photochemical processes in organic materials which require no subsequent treatment or fixing of the recording media is known. Such media may be of the photobleaching type or the photocoloring type. The photobleaching type of media employs a normally highly colored dye which is bleached by light incident thereon while the photocoloring media employs a colorless leuco dye which is subsequently colored by light. These processes are molecular in nature and hence provide excellent image resolution which is generally limited only by the light source used for forming the image.

Two advantages of the photocoloring media as opposed to the photobleaching media are: (1) the wave-length of the recording light and the light used to read the image are generally the same in photobleaching materials and hence a small fraction of the information may be erased each time the data is read, which is not the case with photocoloring media; and (2) the photocoloring media forms an image having an intensity which is proportional to the light absorbed while the image intensity in a photobleaching material depends also upon the amount of dye remaining in an exposed area.

We have unexpectedly discovered that certain dyes which are highly colored in their normal state and generally thought of as useful in the photobleaching type of media can be prepared as colorless thin films which have good adhesion to their substrates and are useful as a photocoloring media.

SUMMARY OF THE INVENTION

An optical recording media comprises a substrate having a thin film of a vacuum sublimed xanthene type dye thereon.

BRIEF DESCRIPTION OF THE DRAWINGS

The sole figure is a plot of optical density versus wavelength showing the absorption characteristics of a novel recording media before and after exposure to ultraviolet radiation.

DESCRIPTION OF THE PREFERRED EMBODIMENTS

We have discovered that a certain class of xanthene type dyes, when vacuum sublimed onto a substrate, lose their color and form a clear, colorless, amorphous, adherent and stable film which can be intensely permanently colored upon exposure to ultra-violet light. This product is useful as an information storage and display media.

Xanthene itself, which has the structural formula

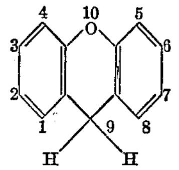

does not exhibit this property and retains its normal color upon vacuum sublimation. The class of xanthene dyes which lose their natural color upon vacuum sublimation to form the novel storage media consisting of a colorless film on a substrate are xanthene derivatives which contain a pendant phenyl ring in the 9th position. The phenyl ring of these compounds has a carboxylic acid group on a carbon atom adjacent the carbon atom attached to the 9th carbon in the xanthene structure. In addition, the xanthene structure should include functional groups thereon which are electron withdrawing. The total electron withdrawing ability of these functional groups on the xanthene structure is greater than that of one doubly bonded oxygen atom.

Examples of useful xanthene type dyes include rhodamine B, represented by the formula;

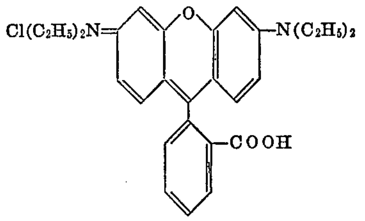

mordant red, represented by the formula;

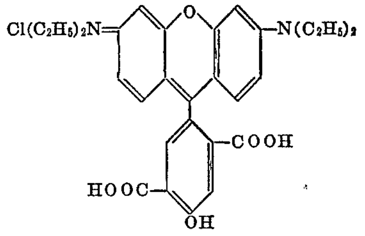

and solvent orange 16 represented by the formula;

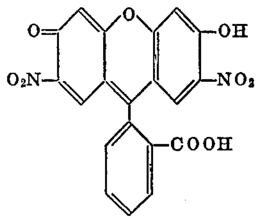

Essentially colorless films do not result from the vacuum sublimation of xanthene compounds where the carboxylic acid groups present in the 11th or 15th position of the pendant phenyl group are esterified such as with rhodamine 3GO or rhodamine 6G. Likewise, colorless films do not result from the vacuum sublimation of xanthenes which do not have a pendant phenyl ring in the 9th position, such as pyronine G or pyronine B. While fluorescein possesses the same general structure as the useful materials, it does not form a colorless film since the electron affinity (electron withdrawing capability) of the one doublebonded oxygen in the xanthene structure is insufficient to give rise to the structure in the solid film responsible for the colorless state and the subsequent photochemical change to the color stored. If, however, another electron withdrawing group is added to the fluorescein molecule, such as an $NO_2$ group, preferably in the 5th position of the xanthene ring, this fluorescein derivative is useful in forming a colorless vacuum sublimed film that is photocolorable.

We postulate that the formation of a lactone structure wherein the carboxylic acid group forms a closed 5 membered ring as shown below, for rhodamine B is responsible for the colorless film.

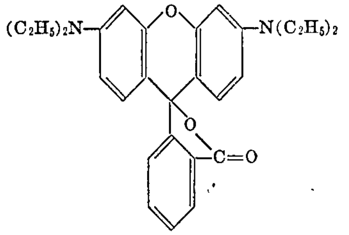

Definitive proof, however, of this hypothesis is lacking and the postulation is merely offered as an attempt to aid one to better understand the mechanism involved in the preparation of the novel storage media.

When U.V. light of wavelengths preferably below 3300 A. are incident upon the colorless film, the film becomes colored.

In order to generate an optical density of one (10% transmission) in a typical colorless rhodamine B film on a substrate, energy densities of from about 0.1–0.2 joules/cm.$^2$ are generally required in the form of U.V. light. This is comparable to the well known diazo process. Optical densities per unit thickness exceed four per micron upon saturation of the color. Resolution tests of the novel media indicates no ascertainable graininess. Absorption of visible light by the exposed media causes no appreciable effect.

The novel films can be deposited onto a variety of substrates. For example, quartz, potassium bromide, Mylar (a polyethyleneterephthalate polyester), Vinylite and Lexan (a polycarbonate) have been employed as substrates. Vacuum sublimation is preferably carried out in a vacuum of $10^{-6}$–$10^{-7}$ torr such that minimum heating of the dye is required for sublimation. One may also deposit separate layers or mixtures of xanthene dyes on the same substrate.

We have found that the purity of the starting material used for forming the vacuum sublimed films is an important factor in obtaining clear films. For example, the use of commercially obtained reagent grade rhodamine B resulted in highly colored films. However, after purification of this commercial material by means of column chromatography, clear films were obtained. During the chromatographic purification about 40% of the starting material was lost. Generally, essentially clear films are obtained from starting materials which have been carefully purified by means of column chromatography utilizing basic alumina in the column and methyl alcohol as the eluant. Such films have an unperceptible coloration ($K<0.01$) even when the films are up to four microns thick. The value, K, represents the optical density of the film. After exposure of the novel film to U.V. radiation, values of K of somewhat greater than 4 have been achieved in one micron thick films resulting in extremely high contrast ratio capabilities.

Other observations relating to the purity of the dye starting material also indicate that for most purposes it is advantageous to obtain as high a purity dye as possible for use in forming the films of the novel storage media. For example, it has been found that the dye sensitivity diminishes at wavelengths longer than 3000 A. as the purity increases. This means that higher purity films would be less sensitive to ambient light thus extending the life of the media in the ambient. In addition, the sensitivity increases for wavelengths shorter than 3000 A. such that efficiency appears to increase.

The extent of initial coloration of the vacuum sublimed films is somewhat a function of the substrate material as well as the purity of the starting material. On some substrates, the vacuum sublimed film may have a pinkish or somewhat darker hue with an optical density in the neighborhood of 0.1, or the film may tend to have a short shelf-life in the ambient or even in the dark. Open or porous structure polymers such as some vinyl resins and polyurethane and rough surfaces such as found in Teflon and zinc oxide coatings fall into the above class.

Preferred substrates, upon which clear films can be formed include closed or non-porous polymers having smooth surfaces such as Mylar, Vinylite and Lexan and inorganic crystalline materials such as quartz and potassium bromide.

The sole figure is a plot of the optical density of a typical rhodamine B film on a quartz substrate before (solid lines) and after (dotted lines) irradiation with ultraviolet light. It can readily be seen from the figure that the film obtained upon vacuum sublimation has essentially no absorption in the visible region of the spectrum while after exposure to U.V. the visible absorption is quite large.

What is claimed is:

1. An optical recording media comprising a substrate having an essentially colorless, photocolorable film thereon of a dye having the formula:

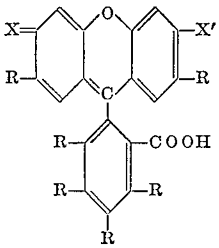

wherein R independently at each occurrence is selected from the group consisting of hydrogen, lower alkyl, nitro, hydroxyl and carboxyl groups, X can be =O or $=N(R_1)_2Cl$ wherein $R_1$ independently at each occurrence is selected from the group consisting of hydrogen or lower alkyl and X′ is hydroxyl or $=N(R_1)_2Cl$ wherein $R_1$ has the meaning given above, said dye having been vacuum sublimed to a colorless state.

2. The optical recording media recited in claim 1 wherein the substrate is selected from the group consisting of inorganic crystals and smooth surfaced, non-porous polymers.

3. The optical recording media recited in claim 1 wherein the substrate is selected from the group consisting of quartz, polyethylene terephthalate, polycarbonate and vinylite.

4. An optical recording media comprising a substrate having an essentially colorless, photocolorable film thereon of at least one compound selected from the group consisting of compounds having the structure

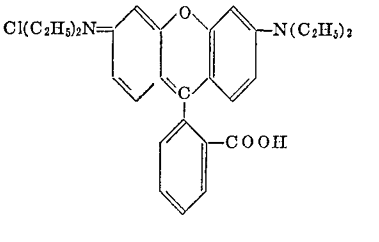

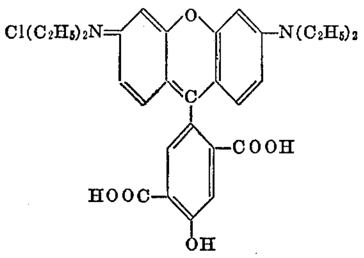

and

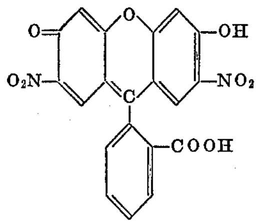

said compounds having been vacuum sublimed to a colorless state.

5. The optical recording media recited in claim 4 wherein said film includes rhodamine B of the formula:

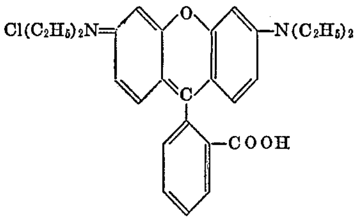

6. The optical recording media recited in claim 4 wherein said film includes mordant red of the formula:

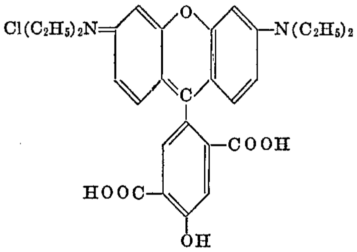

7. The optical recording media recited in claim 4 wherein said film includes solvent orange 16 of the formula:

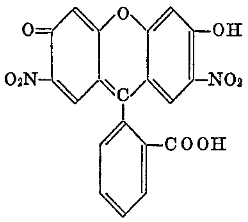

References Cited

UNITED STATES PATENTS

| | | | |
|---|---|---|---|
| 3,272,635 | 9/1966 | Sprague et al. | 96—90 |
| 3,485,633 | 12/1969 | Tulagin et al. | 96—89 |

NORMAN G. TORCHIN, Primary Examiner

W. H. LOUIE, Jr., Assistant Examiner

U.S. Cl. X.R.

96—89